US009216357B2

(12) United States Patent
Inoue et al.

(10) Patent No.: US 9,216,357 B2
(45) Date of Patent: Dec. 22, 2015

(54) GAME MACHINE, AND, CONTROL METHOD OF CONTROLLING COMPUTER AND COMPUTER PROGRAM USED THEREIN

(75) Inventors: Atsushi Inoue, Zama (JP); Masato Okuaki, Zama (JP); Tomoaki Hirai, Zama (JP)

(73) Assignee: KONAMI GAMING, INCORPORATED, Las Vegas, NV (US)

( * ) Notice: Subject to any disclaimer, the term of this patent is extended or adjusted under 35 U.S.C. 154(b) by 0 days.

(21) Appl. No.: 14/376,806

(22) PCT Filed: Feb. 8, 2012

(86) PCT No.: PCT/US2012/024259
§ 371 (c)(1),
(2), (4) Date: Aug. 5, 2014

(87) PCT Pub. No.: WO2013/119220
PCT Pub. Date: Aug. 15, 2013

(65) Prior Publication Data
US 2015/0005068 A1    Jan. 1, 2015

(51) Int. Cl.
*A63F 9/24* (2006.01)
*A63F 13/00* (2014.01)
*G06F 17/00* (2006.01)
*G06F 19/00* (2011.01)
*A63F 13/52* (2014.01)
*G07F 17/32* (2006.01)

(52) U.S. Cl.
CPC ............ *A63F 13/52* (2014.09); *G07F 17/3211* (2013.01)

(58) Field of Classification Search
USPC .............................. 463/20, 25, 30, 31, 40, 42
See application file for complete search history.

(56) References Cited

U.S. PATENT DOCUMENTS

| 5,772,511 A | 6/1998 | Smeltzer |
| 2004/0121834 A1 | 6/2004 | Libby et al. |
| 2006/0287054 A1 | 12/2006 | Walker et al. |
| 2009/0227353 A1 | 9/2009 | Yoshizawa |
| 2010/0210347 A1* | 8/2010 | Seelig et al. ................ 463/20 |
| 2011/0170746 A1* | 7/2011 | Pryor ........................ 382/103 |
| 2012/0004036 A1 | 1/2012 | Hill |

FOREIGN PATENT DOCUMENTS

| JP | 11-235464 A | 8/1999 |
| JP | 4331173 B2 | 9/2009 |

OTHER PUBLICATIONS

International Search Report and Written Opinion—Date of Mailing: May 18, 2012.

* cited by examiner

*Primary Examiner* — Adetokunbo O Torimiro
(74) *Attorney, Agent, or Firm* — Howard & Howard Attorneys PLLC

(57) ABSTRACT

A game machine uses a center unit that utilizes a physical operation of a ball to select at least one pocket by a drawing, and includes: cameras that are placed to be able to take images of the pockets; a center monitor that can display a video picture taken by the camera; and, sensors that detects the pocket decided by the drawing. And, the game machine specifies a predetermined video picture range from the video picture taken by the cameras, based on a detection result of the sensors, so as to include the video picture of the selected pocket at a time when the selected pocket is selected, and, displays a predetermined video picture on the center monitor based on the video picture in the predetermined video picture range specified.

17 Claims, 8 Drawing Sheets

GAME MACHINE, AND, CONTROL METHOD OF CONTROLLING COMPUTER AND COMPUTER PROGRAM USED THEREIN

CROSS REFERENCE TO RELATED APPLICATION

This application is a national stage application of PCT/US2012/024259, filed Feb. 8, 2012, the disclosure of which is hereby incorporated by reference in its entirety.

TECHNICAL FIELD

The present invention relates to a game machine using for a progression of a game, a physical drawing mechanism that utilizes a physical operation of a drawing medium to select at least one option from options.

BACKGROUND ART

There is well known a game machine using a physical drawing mechanism that utilizes a physical operation of a drawing medium to select at least one option from options for a progression of a game (for example, see Patent Literature 1). There is also well known a game device that takes an image of a player during the game and displays the taken video picture on a monitor (for example, see Patent Literature 2). Patent Literature 1: Japanese Patent No. 4331173. Patent Literature 2: Japanese Patent Application Laid-Open No. 11-235464.

SUMMARY OF INVENTION

Technical Problem

Sometimes a drawing result is instantaneously decided since the drawing by the physical drawing mechanism depends on the physical operation. In such cases, a time period for which the player feels a joy becomes shortened in the game machine of Patent Literature 1. On the other hand, in the game device of Patent Literature 2, the image of the player is taken during the game, and the taken video picture is displayed on the monitor on the condition that an event and the like are generated. However, the game device of Patent Literature 2 does not take the video picture relating to a game result such as a drawing result.

An object of the invention is to provide a game machine that can confirm the drawing result anew using the video picture relevant to the drawing result of the physical drawing mechanism, and can confirm the drawing result in longer time with powerful production, and, a control method of controlling a computer and a computer program used therein.

Solution to Problem

In order to solve the above problems, a game machine according to the present invention uses a physical drawing mechanism that utilizes a physical operation of a drawing medium to select at least one option from options by a drawing for a progression of a game, wherein the game machine comprises: at least one image taking device that is placed to be able to take images of the options in the progression of the game; a display device that can display a video picture taken by the image taking device; an option detection device that detects the option decided by the drawing of the physical drawing mechanism in the options; a video picture specifying device that specifies a predetermined video picture range from the video picture taken by the image taking device, based on a detection result of the option detection device, so as to include the video picture of the selected option at a time when the selected option is selected; and a video picture output device that displays a predetermined video picture on the display device based on the video picture in the predetermined video picture range specified by the video picture specifying device.

According to the invention, at the time when at least one option is selected by the drawing of the physical drawing mechanism from the video picture in which the options are taken, the video picture range including the video picture of the selected option is specified. And, the predetermined video picture is displayed on the display device based on the video picture range. That is, the drawing result of the physical drawing mechanism can be guided again by the video picture displayed on the display device. Therefore, it is possible to confirm the drawing result anew even if the drawing result of the physical drawing mechanism can not be understood in a moment, since the drawing result can be confirmed by the display device in addition to the actual drawing of the physical drawing mechanism. Additionally, it is possible to guide the drawing result in longer time with powerful production by adopting, for example, a slow video picture displaying the taken video picture slow, a repetition video picture displaying the taken video picture repeatedly, an enlarged video picture enlarging and displaying the taken video picture, and an angle switching video picture switching an image taking angle as the predetermined video picture.

Also, in order to the above problems, a control method of controlling a computer according to the present invention is a control method of controlling a computer which is incorporated in a game machine using a physical drawing mechanism that utilizes a physical operation of a drawing medium to select at least one option from options by a drawing for a progression of a game, and the game machine including the at least one image taking device that is placed to be able to take images of the options in the progression of the game; a display device that can display a video picture taken by the image taking device; an option detection device that detects the option decided by the drawing of the physical drawing mechanism in the options; wherein the control method of controlling the computer comprises the steps: a video picture specifying step that specifies a predetermined video picture range from the video picture taken by the image taking device, based on a detection result of the option detection device, so as to include the video picture of the selected option at a time when the selected option is selected; and a video picture output step that displays a predetermined video picture on the display device based on the video picture in the predetermined video picture range specified by the video picture specifying step.

Also, in order to the above problems, a computer program for a game machine according to the present invention is a computer program for a game machine using a physical drawing mechanism that utilizes a physical operation of a drawing medium to select at least one option from options by a drawing for a progression of a game, and the game machine including the at least one image taking device that is placed to be able to take images of the options in the progression of the game; a display device that can display a video picture taken by the image taking device; an option detection device that detects the option decided by the drawing of the physical drawing mechanism in the options; wherein the computer program is configured to make the computer serve as: a video picture specifying device that specifies a predetermined video picture range from the video picture taken by the image taking device, based on a detection result of the option detection device, so as to include the video picture of the selected option at a time when the selected option is selected; and a video picture output device that displays a predetermined video picture on the display device based on the video picture in the predetermined video picture range specified by the video picture specifying device. According to the control method of controlling the computer or the computer program of the present invention, it is possible to realize the game machine of the present invention.

DESCRIPTION OF EMBODIMENTS

Figure 1:
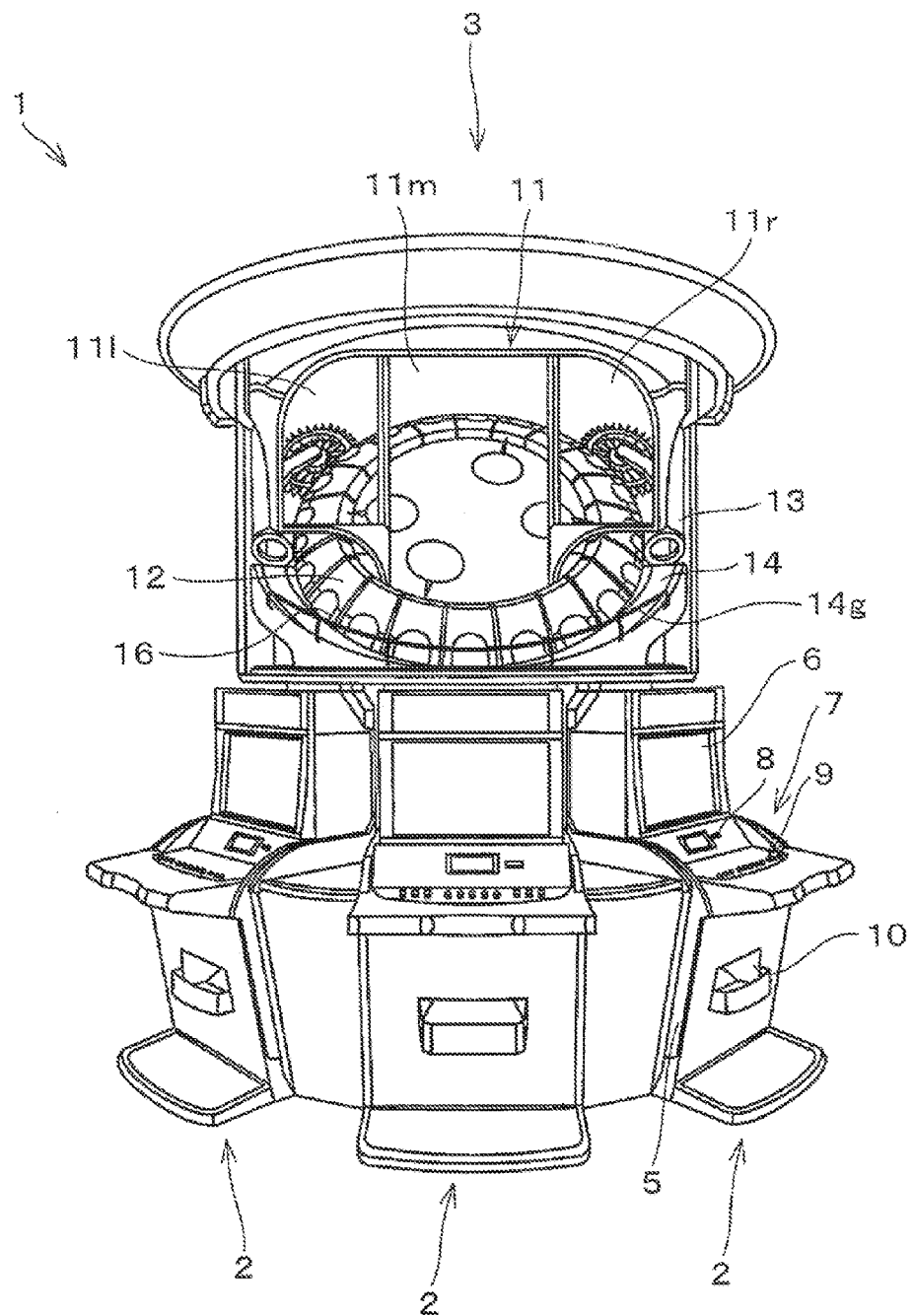
FIG. 1 is an appearance view of the game machine of the embodiment.

Hereinafter, a game machine according to an exemplary embodiment of the invention will be described below with reference to the drawings. FIG. 1 is an appearance view of the game machine of the embodiment. As illustrated in FIG. 1, a game machine 1 includes three station units 2 and a center unit 3 that serves as a physical drawing mechanism. The three station units 2 are disposed around the center unit 3. In addition, although the three station units 2 are illustrated in FIG. 1, the number of station units 2 may properly be determined. For example, one station unit 2 may be disposed.

In the station unit 2, a slot game is provided in exchange for consumption of a coin as a game value. The slot game means a well-known game in which, while displays of plural symbols are changed according to the drawing result, a predetermined privilege is provided in the case that a combination of the displays of the plural symbols forms a predetermined prize array after the change. The station unit 2 includes a chassis 5. A station monitor 6 is provided in a front surface of the chassis 5. For example, a liquid crystal display device is used as the station monitor 6. A control panel 7 is provided below the station monitor 6. A coin insertion slot 8 and a manipulation device 9 are provided in the control panel 7. For example, the manipulation device 9 includes a manipulation member, such as a button switch, which is used to perform various manipulations such as a bet manipulation. A coin payment port 10 is provided below the control panel 7.

The center unit 3 provides what is called a roulette game, in which the drawing is performed by utilizing one of plural pockets provided around a circular roulette wheel in which a ball that rotational-transfers along an outer circumference of the roulette wheel is accommodated. For example, the roulette game is used as one of the predetermined privileges that are given in the slot game provided by the station unit 2. A predetermined bonus is provided to the player of the station unit 2 according to a result of the roulette game.

The center unit 3 includes a center monitor 11 that serves as a display device, a large roulette 12 as a roulette wheel, a ball input mechanism 13, and a ball guide path 14 that serves as a guide path. The center monitor 11 includes a main monitor 11m, a right monitor 11r that is disposed on the right of the main monitor 11m, and a left monitor 11l that is disposed on the left of the main monitor 11m. The result of the roulette game and the like, for example, is displayed on the main monitor 11m. On the other hand, for example, auxiliary information such as contents of the bonus obtained by the roulette game is displayed on the right monitor 11r and left monitor 11l.

The large roulette 12 is disposed so as to form an inclination, in which a front side (a side on which the station unit 2 is disposed) is located downward while a depth side opposite to the front side is located upward. The large roulette 12 is also disposed below the center monitor 11 such that the upward portion of the inclination is hidden behind the center monitor 11. A driving mechanism 15 (see FIG. 2) rotates the large roulette 12 at a predetermined speed in a predetermined direction. Plural pockets 16 that serve as plural options and plural accommodation units are provided around the large roulette 12. One of the plural bonuses given to the player is allocated to each pocket 16.

The ball input mechanism 13 inputs the ball that serves as drawing medium to the ball guide path 14. The ball guide path 14 is formed so as to extend along the outer circumference of the large roulette 12. A guard 14g as a restriction device that restricts movement of the ball is provided on the outer circumference side of the ball guide path 14, namely, on the opposite side to the side of the large roulette 12. The guard 14g restricts the movement of the ball such that the ball drops out from the ball guide path 14. On the other hand, the restriction device is not provided on the side of the large roulette 12 of the ball guide path 14 such that the ball can be guided to the pocket 16. That is, the ball guide path 14 is formed such that a movement range of the ball input by the ball input mechanism 13 is restricted to a given range, and such that the ball can be guided to one of the pockets 16 of the large roulette 12.

When the roulette game is started, the large roulette 12 starts the rotation. And, the ball for the large roulette is input by the ball input mechanism 13 to the ball guide path 14. The input ball moves along the ball guide path 14. Since the large roulette 12 is inclined such that the front side is located downward, the same inclination is formed in the ball guide path 14. Accordingly, the ball moves temporarily toward the opposite side to the ball input mechanism 13 along the ball guide path 14, and the ball changes the movement direction in the middle of the inclination to return onto the side of the ball input mechanism 13. After the movement of the ball is repeated for a constant certain amount of time, the movement range of the ball converges to the lowest position of the ball guide path 14, namely the position corresponding to the bottom of the large roulette 12. Then, in proper timing, the ball falls into one of the pockets 16 (mainly, the pocket 16 located in the bottom in the proper timing) of the large roulette 12. The bonus corresponding to the pocket 16 into which the ball falls is provided to the player.

An image that compensates the hidden portion of the large roulette 12 is displayed on the center monitor 11. Specifically, as illustrated in FIG. 1, the images corresponding to the hidden portions of the large roulette 12 are continuously displayed on the main monitor 11m, the right monitor 11r, and the left monitor 11l. That is, the three monitors 11m, 11r, and 11l are used so as to act as one center monitor 11. The images corresponding to the large roulette 12, which are displayed on the main monitor 11*m*, the right monitor 11*r*, and the left monitor 11*l*, also rotate such that the rotation of the large roulette 12 is virtually produced while the large roulette 12 rotates. Similarly the images corresponding to the large roulette 12, which are displayed on the main monitor 11*m*, the right monitor 11*r*, and the left monitor 11*l*, stop when the large roulette 12 stops.

Figure 2:
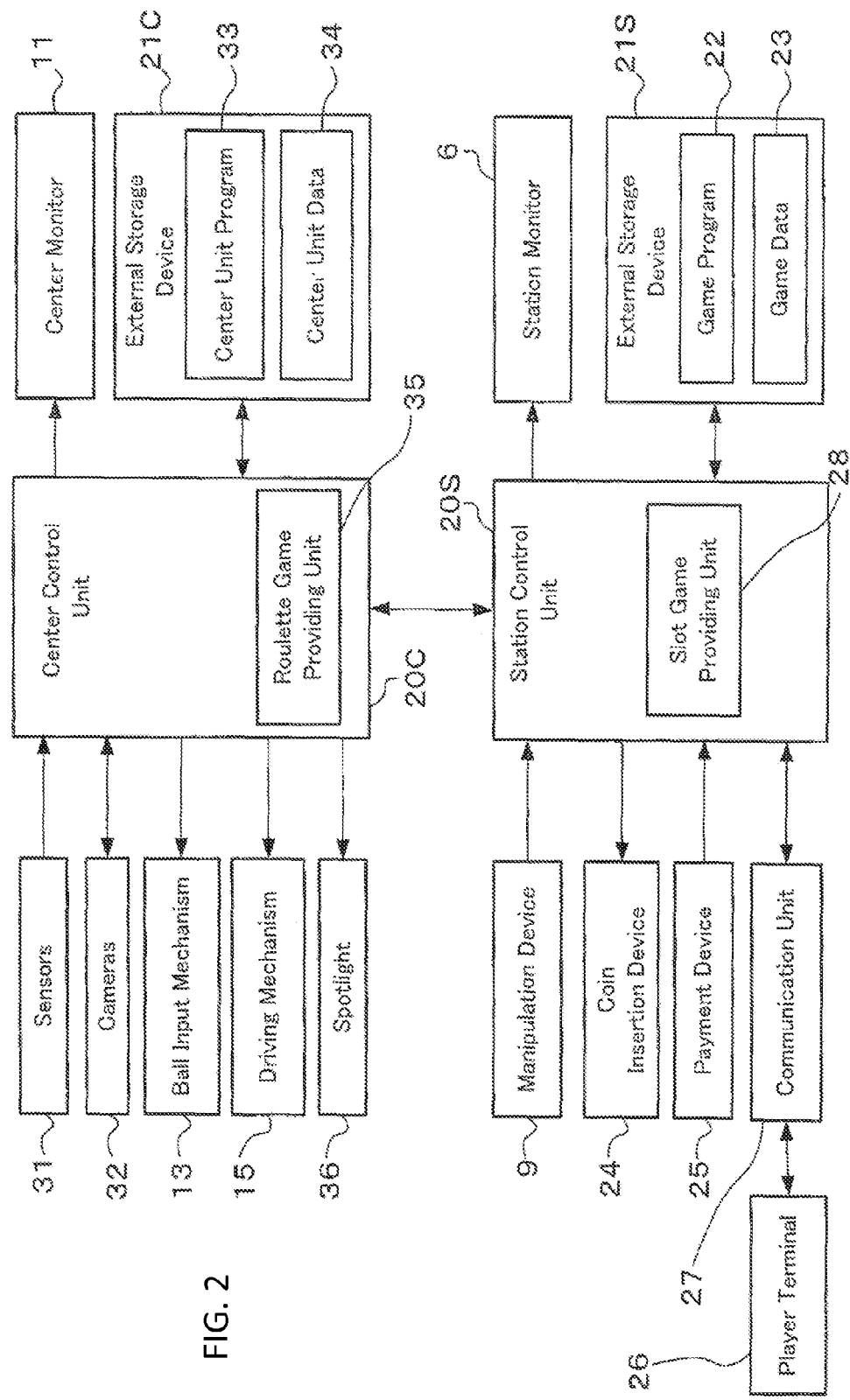
FIG. 2 is a functional block diagram illustrating a schematic configuration of the control system of the game machine.

A configuration of a control system of the game machine 1 will be described with reference to FIG. 2. FIG. 2 is a functional block diagram illustrating a schematic configuration of the control system of the game machine 1. As illustrated in FIG. 2, a center control unit 20C and a station control unit 20S are provided in the game machine 1. The station control unit 20S is configured as a computer unit that controls the station unit 2. The station control unit 20S is configured as a computer unit that includes a microprocessor and other peripheral devices such as a main storage unit necessary for the operation of the microprocessor and the like. In each station unit 2, the control unit 20S is provided as a component of the station unit 2. The center control unit 20C and each station control unit 20S are connected so as to be able to transmit and receive information to and from each other.

An external storage device 21S is further connected to the station control unit 20S. For example, as the external storage device 21S, there is used a storage medium which is capable of holding storage without feeding of power such as a magnetic storage medium, an optical storage medium including a DVD-ROM etc., a nonvolatile semiconductor memory including an EEPROM etc., or the like.

A game program 22 and game data 23 are stored in the external storage device 21S. The game program 22 is a program necessary for the station unit 2 to execute the slot game. The game data 23 is various pieces of data that are used in executing the game program 22. The game program 22 is properly read into and executed by the station control unit 20S. The game data 23 is also read into and referred by the station control unit 20S. In addition, various program modules necessary to execute the game are included in the game program 22. However, they are not illustrated in the drawings. Similarly various pieces of data such as reel data, sound effect data, and dividend data are also included in the game data 23. However, they are also not illustrated in the drawings.

A slot game providing unit 28 is provided in the station control unit 20S by executing the game program 22. The slot game providing unit 28 executes processing that is necessary for the station unit 2 to provide the slot game. As an example, the slot game providing unit 28 executes pieces of processing such as the change of the display of the plural symbols, generation of a random number having the predetermined number of digits, the drawing of the plural symbols that should be displayed after the change using the random number, and a determination whether the combination of the plural symbols after the change forms the predetermined prize array or not. The slot game providing unit 28 is a logical device that is constructed by a combination of the microprocessor and software. In addition, a physical device constructed by a combination of electronic circuits may be used to generate a random number. Additionally, a logical device and a physical device, which are necessary to execute the slot game, are properly provided in the station control unit 20S. However, they are not illustrated in the drawings.

The manipulation device 9 and the station monitor 6 described above are connected to the station control unit 20S. The manipulation device 9 outputs a signal corresponding to a player's manipulation to the station control unit 20S. The station monitor 6 displays an image corresponding to an image signal output from the station control unit 20S. The station control unit 20S executes the game in a predetermined procedure according to the game program 22 while referring to the output signal of the manipulation device 9. Therefore, the station control unit 20S displays a game screen on the station monitor 6 according to a situation of the slot game.

A coin insertion device 24 and a payment device 25, which serve as the input device or the output device necessary to execute the slot game, are also connected to the station control unit 20S. The coin insertion device 24 receives an input of the coin as a counter value for playing the game through the coin insertion slot 8. And, the coin insertion device 24 outputs a signal corresponding to an input volume (input amount) of coin to the station control unit 20S.

The payment device 25 executes the payment of the coin as a dividend of the game to the player in response to an instruction from the station control unit 20S. The payment of the coin is performed through the coin payment port 10. In addition, the received counter value and the dividend for the player are not limited to the coin. For example, as substitute money such as a medal, a token, or the like may be used. Alternatively, an accounting method in which the value of money or the value of play can be exchanged through electronic money or other exchanges of electronic information may be adopted. In this case, information communication device in which pieces of electronic information are mutually exchanged and a storage medium in which the exchanged information is stored may be used instead of the coin insertion slot 8 and the coin payment port 10.

A communication unit 27, which serves as a communication device that can transmit and receive the information to and from a player terminal 26 possessed by the player, is connected to the station control unit 20S. For example, a personal computer, a mobile phone and the like are used as the player terminal 26. For example, an infrared communication device that transmits and receives the information using an infrared ray is used as the communication unit 27. The communication unit 27 is controlled by the station control unit 20S. The station control unit 20S transmits a produced moving image acquired from the center control unit 20C and the like (to be hereinafter described) to the player terminal 26 through the communication unit 27. Therefore, the station control unit 20S functions as the terminal output device of the present invention.

On the other hand, the center control unit 20C is configured as a computer unit that controls the center unit 3. The center control unit 20C is configured as a computer unit that includes a microprocessor and other peripheral devices such as a main storage unit necessary for the operation of the microprocessor and the like. Sensors (sensor group) 31 that serves as an option detection device, cameras (camera group) 32 that serves as a manipulation device, and at least one spotlight 36 are connected to the center control unit 20C in addition to the center monitor 11, the driving mechanism 15, and the ball input mechanism 13. An external storage device 21C is connected to the center control unit 20C. For example, as the external storage device 21C, there is used a storage medium which is capable of holding storage without feeding of power such as a magnetic storage medium, an optical storage medium including a DVD-ROM etc., a nonvolatile semiconductor memory including the EEPROM etc., or the like.

A center unit program 33 and center unit data 34 are stored in the external storage device 21C. The center unit program 33 is a program that is necessary for the center unit 3 to execute the roulette game. The center unit data 34 is various pieces of data that are used in executing the center unit program 33. The center unit program 33 is properly read into and executed by the center control unit 20C. The center unit data 34 is properly read into and referred by the center control unit 20C. In addition, various program modules necessary to execute the roulette game are included in the center unit program 33. However, they are not illustrated in the drawings. Similarly various pieces of data such as sound effect data, dividend data, and image taking range data for specifying an image taking range of each camera 32 are included in the center unit data 34. However, they are not illustrated in the drawings.

A roulette game providing unit 35 is provided in the center control unit 20C by executing the center unit program 33. The roulette game providing unit 35 executes processing that is necessary for the center unit 3 to provide the roulette game. The roulette game providing unit 35 executes various pieces of processing such as processing for controlling the ball input mechanism 13, processing for controlling the driving mechanism 15, processing for controlling the spotlight 36, processing for controlling each camera 32, and produced moving image output processing for displaying on the center monitor 11 a produced moving image in which the video picture taken by each camera 32 is processed and used.

The ball input mechanism 13 inputs the ball at a proper speed in proper timing under the control of the roulette game providing unit 35. Also, under the control of the roulette game providing unit 35, the driving mechanism 15 rotates the large roulette 12 at a predetermined speed in a predetermined direction, and stops the rotation of the large roulette 12 in a proper position in proper timing. Similarly, the irradiating position of the spotlight 36, the irradiating timing, the flash, and the change of light colors etc. are controls by the roulette game providing unit 35. Further, an image taking time of each camera 32 is controlled by the roulette game providing unit 35. And, a produced image for producing the result of the roulette game is displayed on the center monitor 11 by executing the produced moving image output processing. The detailed produced moving image output processing executed by the roulette game providing unit 35 is described later. In addition, each camera 32 may be controlled by the roulette game providing unit 35 when the camera 32 is configured to be able to change the image taking direction and the image taking range.

The spotlight is disposed so as to be able to irradiate a moving path of the ball input with light and an image taking range of the cameras 32. Each sensor 31 is provided in order to detect the pocket 16 into which the ball falls. Specifically, the sensors 31 are provided in the pockets 16 so as to correspond to each pocket 16 one by one. And, each sensor 31 is configured to detect the ball when the ball falls into each pocket 16 and so as to output the detection result to the center control unit 20C using a predetermined signal.

Figure 3:
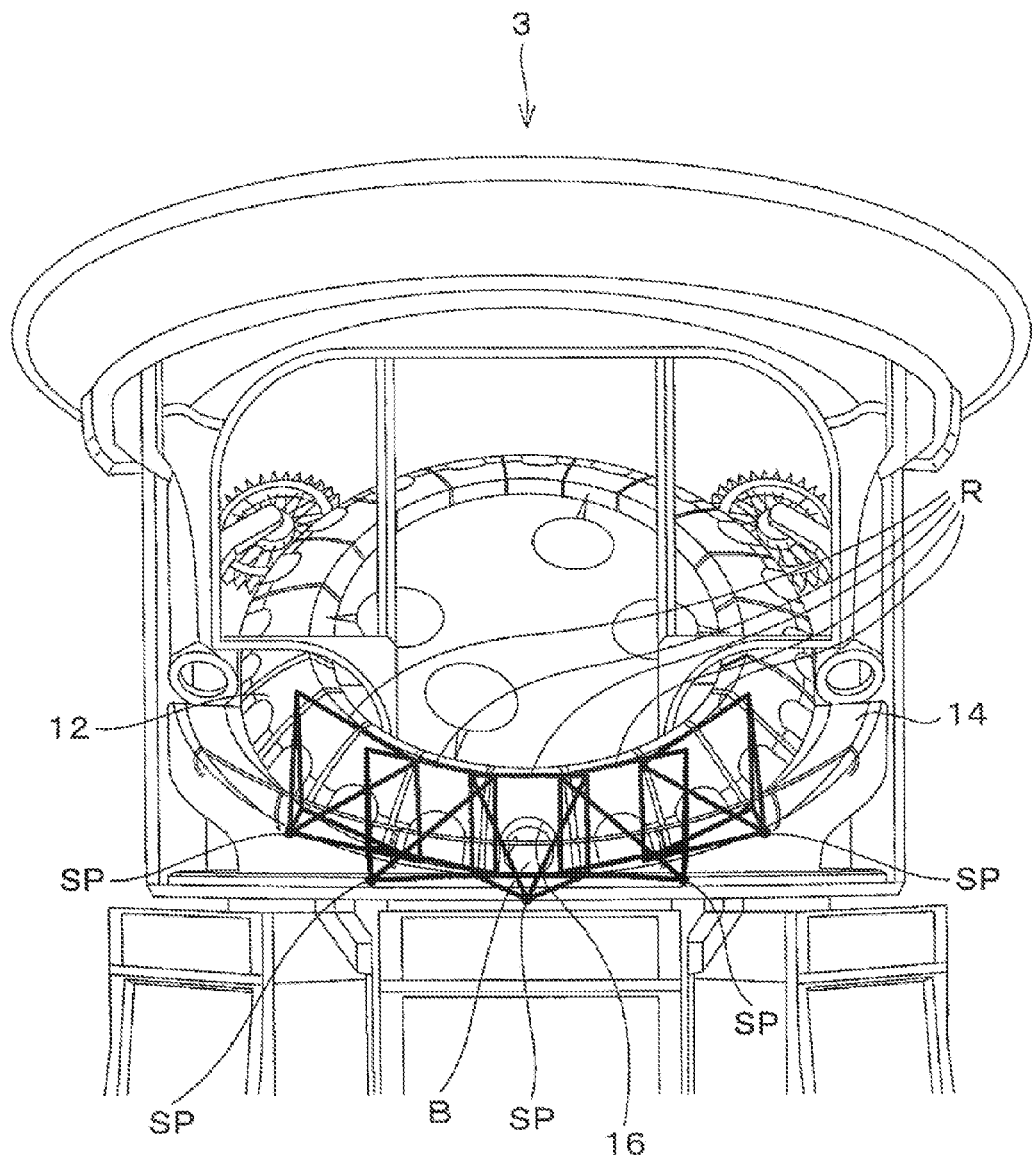
FIG. 3 is a view illustrating a position in which each camera is placed and the image taking range.

Each camera 32 is configured to be able to take a moving image. Also, each camera 32 is controlled so as to continuously take the image from the beginning to the end of the roulette game. For example, the video picture taken by each camera 32 is stored in the external storage device 21C for a predetermined period. Each camera 32 is disposed outside the ball guide path 14. FIG. 3 is a view illustrating a position in which each camera 32 is placed and the image taking range. As illustrated in FIG. 3, an image taking range R of each camera 32 is set toward the pocket 16 from the outer circumference side of the ball guide path 14 such that the image of the situation in which the ball falls into the pocket 16 can be taken. The cameras 32 are disposed at intervals such that one pocket 16 is included in the image taking range R of one camera 32 at a predetermined position.

As an example, in FIG. 3, five cameras 32 are placed at placement points SP at intervals. The placement points SP are symmetrically set in relation to the lowest position of the ball guide path 14, namely, the position corresponding to the bottom of the large roulette 12. More specifically, each camera 32 is disposed such that the following image taking range is set. That is, in a predetermined position, one camera 32 is placed such that the image taking range R is set to the pocket 16 located in the lowest position. Two cameras 32 on the right of the camera 32 are placed such that each image taking range R is set to two pockets 16 adjacent to the right of the lowest pocket 16. On the other hand, two cameras 32 on the left of the camera 32 are placed such that each image taking range R is set to two pockets 16 adjacent to the left of the lowest pocket 16. Additionally, the image taking ranges R of the cameras 32 adjacent to each other are partially overlapped with each other. The camera 32, which is placed such that the image taking range R is set to the pocket 16 located in the lowest position, and each two cameras 32, which are placed so as to be adjacent to the right and left of the camera 32, function as a specific image taking device of the present invention.

Also, the spotlight 36 is controlled so as to assist the taking of camera 32 by irradiating the light to the image taking ranges R of the cameras 32. For example, the irradiating direction of the cameras 32 is controlled so as to follow the ball based on the information from each sensor 31 or each camera 32. The control of like this may be actualized by a switch of plural spotlights 36. Also, the irradiating angle etc. may be controlled so as to brighten the ball and bring the ball to the attention of the player. Further, the productions (rendering) such as a flash of the spotlight 36, a change of the light colors, or the like are may be executed. In addition, the spotlight 36 may be provided so as to be adjacent to each camera 32 for lighting the image taking ranges R of each camera 32. Also, the number of the spotlights 36 may be less than the number of the cameras 32 by being capable of adjusting the angle. Further, as the spotlight 36, there may be used a portion of the lights for decoration.

Next, details of the roulette game will be described below. As described above, for example, the roulette game is provided as one of the privileges in the slot game of the station unit 2. More specifically, for example, the roulette game is used as the privilege when a predetermined prize array is formed by a specific symbol in the slot game. Or, the roulette game may be provided when at least the predetermined number of specific symbols is included in the predetermined prize array.

When the roulette game starts, the large roulette 12 rotates and stops as described above. The video picture that produces the rotation and the stopping of the large roulette 12 is displayed on the center monitor 11 so as to compensate the hidden portion of the large roulette 12 (this is realized by simulation virtually-reproducing the rotation of the large roulette 12. For example, this simulation is executed by the center control unit 20C.). After a ball B falls into the pocket 16, namely, after contents of the bonus to be given are decided, the produced moving image is displayed on the center monitor 11 in order to produce the drawing result.

The produced moving image displayed on the center monitor 11 will be described with reference to FIGS. 4 and 5. The image of a behavior movement of the ball B that moves along the ball guide path 14 in the outer circumference of the large roulette 12 is taken by each camera 32. The moving image taken by each camera 32 is used as the produced moving image. Also, the moving image taken by each camera 32 is used such that the video picture in which the ball B falls into the pocket 16 is included in the produced moving image.

Figure 4:
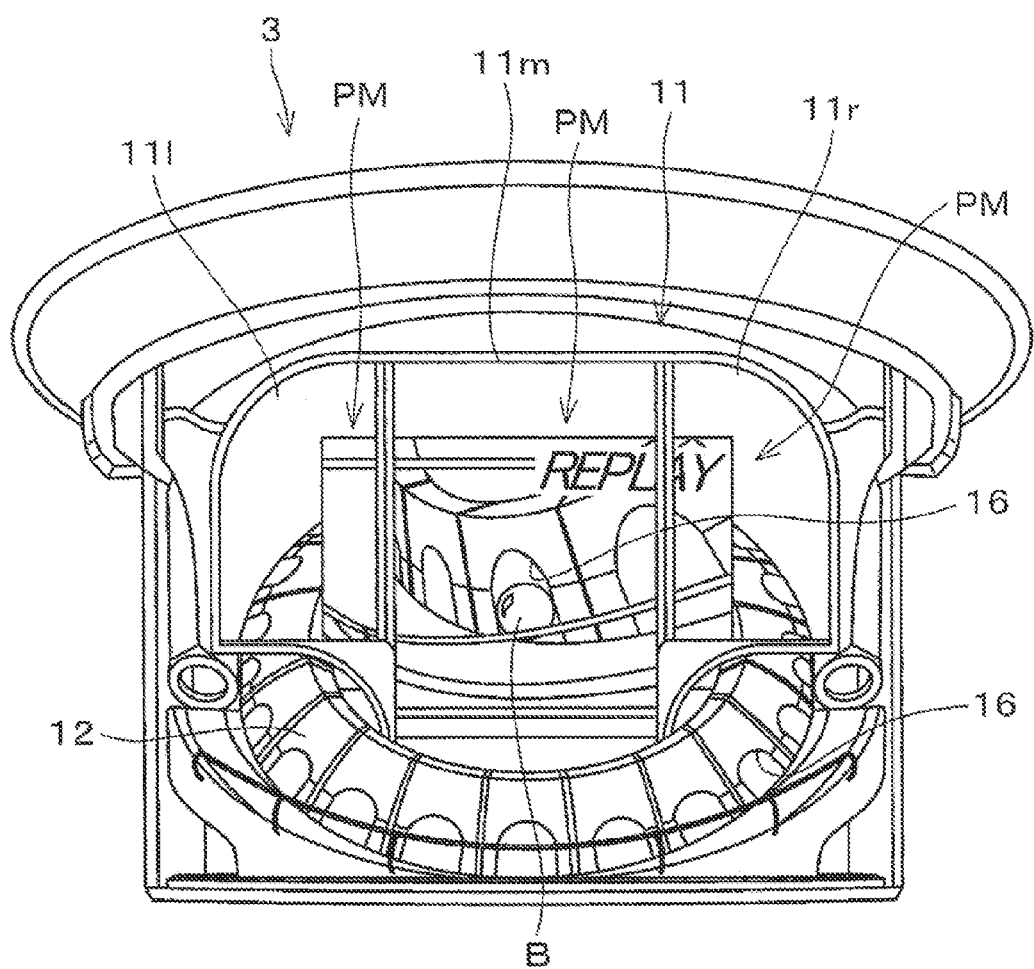
FIG. 4 is an explanatory view illustrating an example of the produced moving image displayed on the center monitor.

FIG. 4 is an explanatory view illustrating an example of the produced moving image displayed on the center monitor 11. And, FIG. 4 schematically illustrates the center monitor 11 of the center unit 3 while the center monitor 11 is enlarged. As illustrated in FIG. 4, the produced moving image PM is mainly displayed on the main monitor 11m. More specifically, the produced moving image PM is divided into and displayed on the monitors 11m, 11r, and 11l such that the three monitors 11m, 11r, and 11l constitute one produced moving image PM. The moving image taken by each camera 32 is processed and used as the produced moving image PM. Specifically, in the example of FIG. 4, a video picture of a moment the ball B falls into the pocket 16 is used, and a video picture in which the process enlarging the video picture of the moment is executed is displayed on the center monitor 11.

Figure 5:
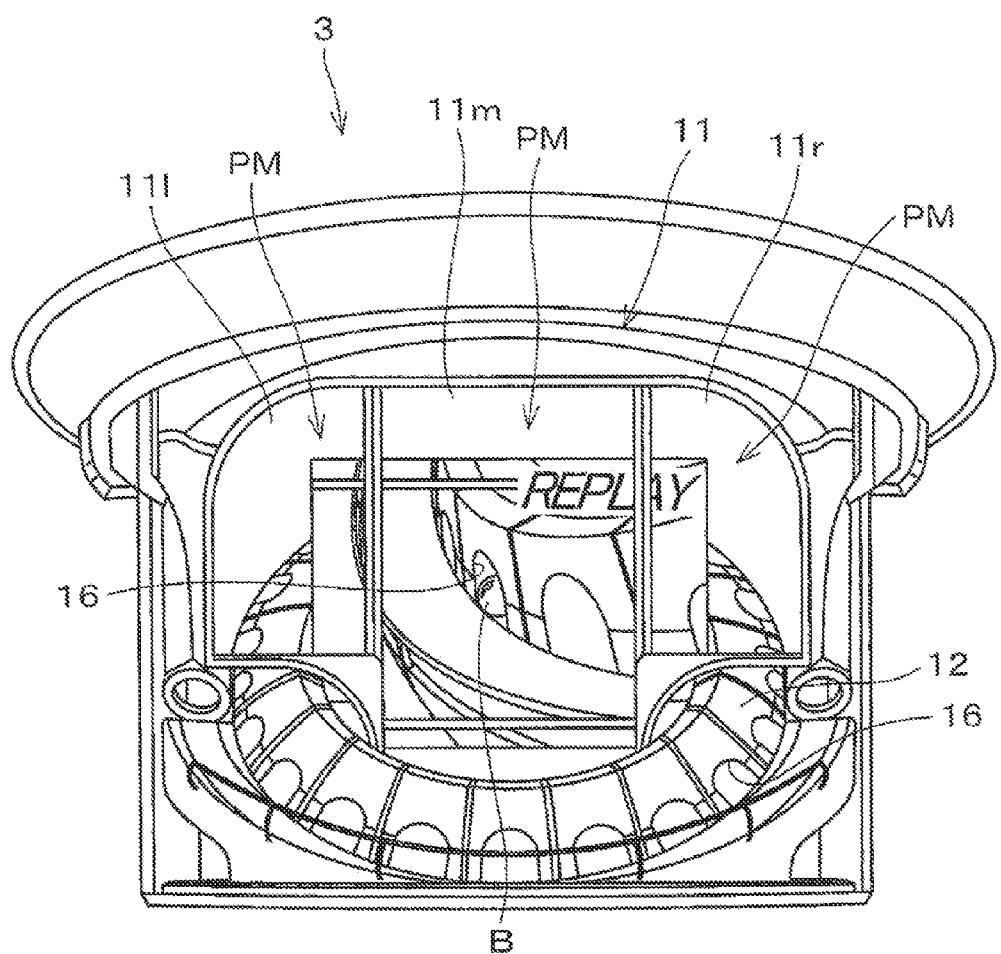
FIG. 5 is an explanatory view illustrating another example of the produced moving image.

On the other hand, FIG. 5 is an explanatory view illustrating another example of the produced moving image PM. And, FIG. 5 illustrates the video picture of the ball B taken by the camera 32 different from the camera 32 that takes the video picture of the produced moving image PM of FIG. 4 at the same time. As illustrated in FIG. 5, in the produced moving image PM, a video picture taken from an angle different from that of FIG. 4 is used as the video picture of the moment the ball B falls into the pocket 16. Additionally, the produced moving image PM includes repetition display in which the video picture of the moment, in which the ball B falls into the pocket 16 as illustrated in FIGS. 4 and 5, is repeatedly displayed. That is, the produced moving image PM includes the video pictures to which processes such as the enlarged display enlarging the moving image taken by each camera 32, the repetition display displaying repeatedly the video picture, and the angle switching display switching the video pictures taken different angles using the video pictures taken from the different angles by the plural cameras 32 are executed.

Figure 6:
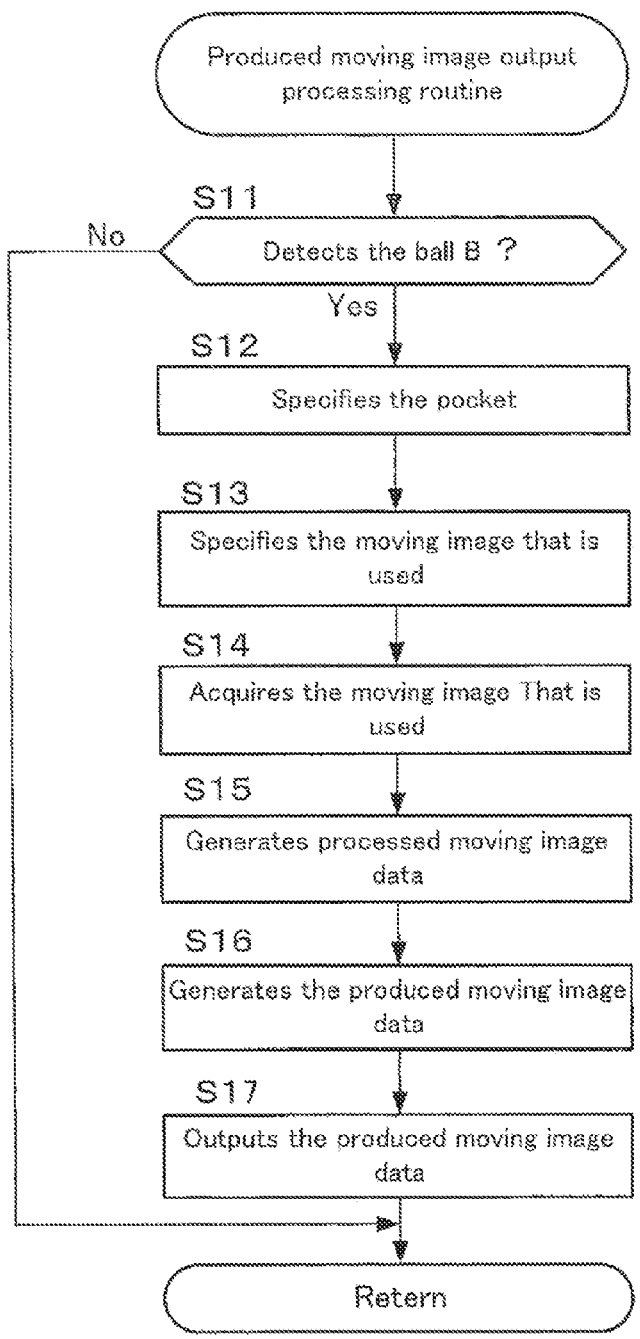
FIG. 6 a view illustrating an example of a flowchart of a produced moving image output processing routine.

Next, the produced moving image output processing executed by the center control unit 20C will be described below. FIG. 6 is a view illustrating an example of a flowchart of a produced moving image output processing routine executed by the center control unit 20C. The center control unit 20C executes the routine of FIG. 6 through the roulette game providing unit 35. The roulette game providing unit 35 repeatedly executes the routine of FIG. 6 with a predetermined cycle. In addition to the routine of FIG. 6, the center control unit 20C or the station control unit 20S executes various well-known pieces of processing necessary to execute the roulette game or the slot game. However, the detailed descriptions of the pieces of processing are omitted.

When the routine of FIG. 6 starts, the roulette game providing unit 35 determines whether each sensor 31 detects the ball B in Step S11. When the determination result is negative, namely, when any sensor 31 does not detect the ball B, the roulette game providing unit 35 skips the subsequent pieces of processing, and ends the current routine.

On the other hand, when the determination result in Step S11 is affirmative, that is, when one of the sensors 31 detects the ball B, the roulette game providing unit 35 proceeds to Step S12. In Step S12, the roulette game providing unit 35 specifies the pocket 16 into which the ball B falls based on the detection result of the sensor 31.

In Step S13, the roulette game providing unit 35 specifies the moving image that is used as the produced moving image PM in the moving images taken by the cameras 32. The specification is performed as follows, for example. The roulette game providing unit 35 specifies the camera 32 corresponding to the pocket 16 specified in Step S12 and the cameras 32 adjacent to the camera 32. Then a predetermined time range including the time when ball B falls into the pocket 16 is specified based on the detection result of the sensor 31. Therefore, in the predetermined time range including the time when ball B falls into the pocket 16, the video pictures taken by the camera corresponding to the pocket 16 into which the ball B falls and the cameras 32 adjacent to the camera are specified as the moving image used in the produced moving image PM. The moving images taken by the cameras 32 in the predetermined time range corresponds to predetermined video picture range of the present invention.

In Step S14, the roulette game providing unit 35 acquires the moving image used as the produced moving image PM, which is specified in Step S13, from the moving images that are taken by the cameras 32 and stored in the external storage device 21C. In addition, as the predetermined period storing the moving image taken by each camera 32, there may be used a period that can be used in Step S14, for example, a period until the next roulette game is started.

In Step S15, the roulette game providing unit 35 generates processed moving image data for reproducing the processed moving image in which the process is performed to the moving image acquired in Step S14. The roulette game providing unit 35 generates the processed moving image data in order to reproduce the processed moving image that is processed so as to include the video pictures such as the enlarged display, the repetition display, and the angle switching display. In Step S16, the roulette game providing unit 35 generates the produced moving image data for reproducing the produced moving image PM including the processed moving image reproduced by the processed moving image data generated in Step S15. As the processed moving image data, the roulette game providing unit 35 generates data in order to reproduce the moving image in which information indicating the repetition display, information on the bonus to be given, or the like are provided to the processed moving image reproduced by the processed moving image data generated in Step S15.

In Step S17, the roulette game providing unit 35 outputs the produced moving image data generated in Step S17 such that the produced moving image PM is displayed on the center monitor 11. When ending the processing in Step S17, the roulette game providing unit 35 ends the current routine. Therefore, the produced moving image PM including the enlarged display, the repetition display and the angle switching display of the moment the ball B falls into the pocket 16 is displayed on the center monitor 11.

As described above, according to the game machine of the embodiment, the image of the progression of the roulette game is taken by the camera 32, and the video picture of the moment when the ball B falls into the pocket 16, namely, the video picture of the moment when the drawing result of the roulette game is decided is displayed on the center monitor 11 as the produced moving image PM by utilizing the image taking result. Therefore, the video picture of the moment the result of the physical drawing is decided by utilizing the ball B in the large roulette 12 can be provided to the player using the large center monitor 11. Accordingly, since the drawing result can be confirmed on the center monitor 11 in addition to the actual behavior of the ball B, the time period for which the drawing result of the roulette game is guided can be extended.

The process such as the enlarged display, the repetition display, and the angle switching display is performed to the produced moving image PM. Therefore, the enlarged video picture of the moment when the drawing result is decided can repeatedly be provided from many angles. That is, the guide of the drawing result can be produced so as to be more emphatically or longer. Therefore, excitability of the player can be enhanced. Further, the produced moving image can be retained in the player terminal 26 and repeatedly used, since the produced moving image can be transmitted to the player terminal 26 through the communication unit 27. Sometimes video recording of the moment when the drawing result is decided is mandatorily required depending on an area or a type of the provided game. In such cases, the recorded video picture can be used to enhance the excitability of the player.

In the example, the center control unit 20C executes the produced moving image output processing routine of FIG. 6 through the roulette game providing unit 35, whereby the center control unit 20C functions as the video picture specifying device and the video picture output device.

Figure 7:
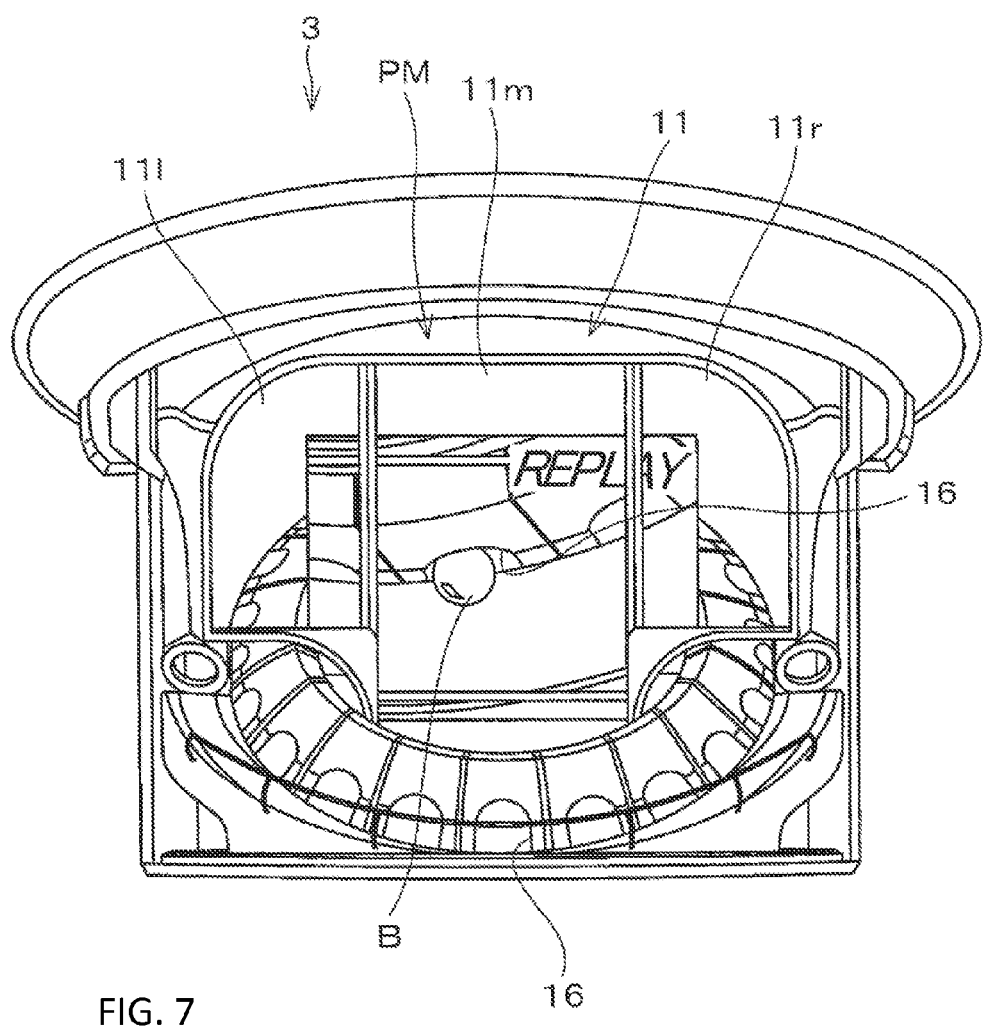
FIG. 7 is a view illustrating an example of the produced moving image when the video picture taken from above is used.
Figure 8:
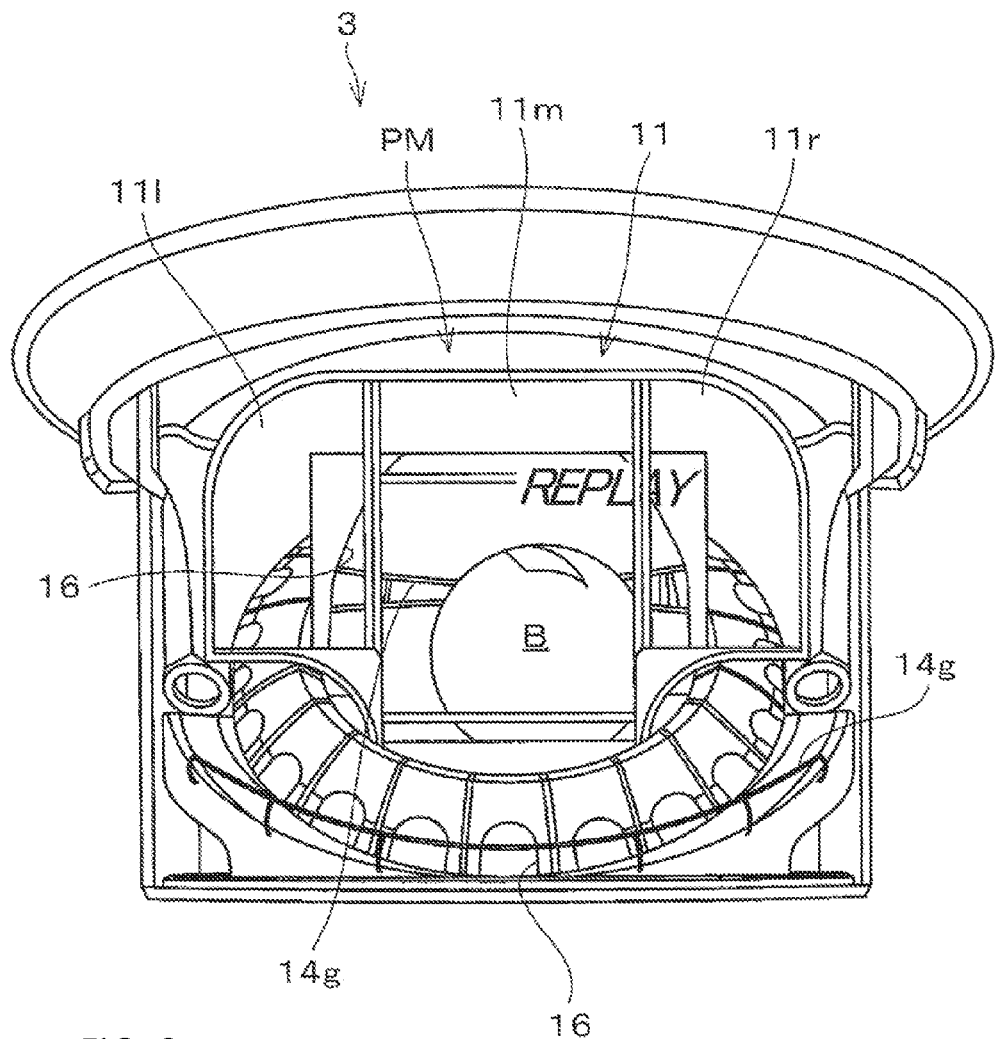
FIG. 8 is a view illustrating an example of the produced moving image when the video picture taken from the inside of the pocket is used.

The present invention is not limited to the above exemplary embodiment, however the invention can be implemented in proper embodiments. In the exemplary embodiment, the angle switching video picture in which the images taken by the cameras 32 disposed on the same plane are switched is used as the produced moving image PM. However, the angle switching video picture is not limited to the above embodiment. The video pictures that are taken from various angles may be used as the angle switching video picture. FIGS. 7 and 8 are views illustrating modifications of the angle switching video picture. FIG. 7 is a view illustrating an example of the produced moving image when the video picture taken from above is used. As illustrated in FIG. 7, the video picture in which the moment when the ball B falls into the pocket 16 is taken from above may be used as one of the angle switching video pictures used in the produced moving image PM. On the other hand, FIG. 8 is a view illustrating an example of the produced moving image when the video picture taken from the inside of the pocket 16 is used. As illustrated in FIG. 8, the video picture in which the moment when the ball B falls into the pocket 16 is taken from the inside of the pocket 16 toward to the outside may be used as one of the angle switching video pictures used in the produced moving image PM. Therefore, an effect of the production can be enhanced. Particularly, the excitability of the game can be enhanced by including the video picture from an observing point at which the player cannot usually see the ball B such as the video picture from the inside of the pocket 16. Thus, the position in which the image taking device is placed is not limited to the outside of the ball guide path 14. The image taking device may be placed in proper positions such as a position above the roulette wheel and a position inside the accommodation unit.

In the exemplary embodiment, the images of the pockets 16 are taken by the plural cameras 32. However, the invention is not limited to the example. For example, the image taking device may be single camera that can take the image of the pocket 16 disposed in the lowest position. In this case, the video picture of the camera in the predetermined time range including the time when the ball falls into the pocket functions as the video picture of the predetermined video picture range.

Also, a back side display (not illustrated) may be provided. On the back side display, there may be displayed the produced moving image PM displayed on the center monitor 11 in synchronization with the display of the center monitor 11. Further, on the back side display (or the center monitor 11), there may be displayed moving images of passed drawing results (which is stored) while the drawing is not executed (so-called idle condition). In such cases, it is also possible to provide reality to the player having no relation with the prize winning. And, the moving images of the passed drawing results displayed on the back side display etc. like above, for example, may be selected based on the station unit number of the player, or may be selected by the player based on the operation of the station unit.

In the exemplary embodiment, the roulette wheel of the physical drawing mechanism is inclined such that the difference in height is formed in the accommodation units. However, the physical drawing mechanism is not limited to the example. For example, the roulette wheel may horizontally be disposed so as not to have the inclination. The roulette wheel may not rotate. In this case, the plural image taking devices that can take the images of the plural accommodation units may be provided. Or, single image taking device that can take the images of all the accommodation units may be provided. In this case, the predetermined video picture range can be specified by specifying the position of the accommodation unit on the taken video picture (for example, each position may be specified based on preliminary setting information).

In the exemplary embodiment, the physical drawing mechanism is used as one of the privileges of the slot machine. That is, the physical drawing mechanism is used for the progression of the game of the slot machine. The game in which the physical drawing mechanism is used is not limited to the game of the slot machine. For example, the physical drawing mechanism may be used for the progression of the bingo game. In this case, for example, the physical drawing mechanism may be configured to be able to be used in the bingo game. Specifically, for example, the physical drawing mechanism may be configured so as to perform the drawing that selects one option from many options such as balls contained in a box. That is, the physical drawing mechanism is not limited to the roulette game.

In the exemplary embodiment, the enlarged video picture, the repetition video picture, or the angle switching video picture is used as the processed video picture. However, the processed video picture is not limited to such video pictures. For example, a slow playback video picture in which the video picture is played back at a speed slower than an actual operating speed of the drawing medium may be used as the processed video picture. Additionally, various video pictures in which the drawing result can be produced may be used as the processed video picture.

In the exemplary embodiment, the sensor 31 is used as the option detection device. However, the option detection device is not limited to the embodiment. For example, the center control unit 20C may function as the option detection device by detecting the pocket 16 in which the ball B is accommodated based on the video picture taken by the camera 32.

The game system of the present invention may be constructed in proper embodiments such as an arcade game machine installed in a commercial facility, a home-use stationary game machine, a portable game machine, and a game machine that is built by utilizing a network.

What is claimed is:

1. A game machine, comprising:
    a physical drawing mechanism, mounted within a frame of the game machine, that utilizes a physical operation of a drawing medium to select at least one option from options by a drawing for a progression of a game,
    at least one image taking device that is placed to be able to take images of the options in the progression of the game;
    a display device that can display a video picture taken by the image taking device, the display device being mounted within the frame relative to the physical drawing mechanism;
    an option detection device that detects the option decided by the drawing of the physical drawing mechanism in the options;
    a video picture specifying device that specifies a predetermined video picture range from the video picture taken by the image taking device, based on a detection result of the option detection device, so as to include the video picture of the selected option at a time when the selected option is selected; and
a video picture output device that displays a predetermined video picture on the display device based on the video picture in the predetermined video picture range specified by the video picture specifying device.

2. The game machine according to claim 1, wherein a plurality of image taking devices, which have image taking ranges individually and can take the images of the options in the progression of the game by combining at least each image taking range, is provided as the at least one specific image taking device, and
the video picture specifying device specifies at least one image taking device that can take the image of the selected option based on the option detection device and each image taking range of each image taking device, and specifies the predetermined video picture range such that the video picture taken by the specified image taking device is included in the predetermined video picture range.

3. The game machine according to claim 2, wherein the image taking devices include specific image taking devices in each of which an image taking range is set such that the image of the selected option can be taken from different angles, and
the video picture specifying device specifies the specific image taking devices as the at least one image taking device that can take the image of the selected option, and specifies the predetermined video picture range such that the video pictures taken by the specified specific image taking devices are included in the predetermined video picture range.

4. The game machine according to claim 3, wherein the video picture output device displays a processed video picture, in which at least a part of a video picture in the predetermined video picture range is processed, on the display device.

5. The game machine according to claim 4, further comprising a light device that can irradiate the image taking range with light.

6. The game machine according to claim 3, further comprising a light device that can irradiate the image taking range with light.

7. The game machine according to claim 2, wherein the video picture output device displays a processed video picture, in which at least a part of a video picture in the predetermined video picture range is processed, on the display device.

8. The game machine according to claim 7, further comprising a light device that can irradiate the image taking range with light.

9. The game machine according to claim 2, further comprising a light device that can irradiate the image taking range with light.

10. The game machine according to claim 1, wherein the video picture output device displays a processed video picture, in which at least a part of a video picture in the predetermined video picture range is processed, on the display device.

11. The game machine according to claim 10, further comprising a light device that can irradiate the image taking range with light.

12. The game machine according to claim 1, further comprising a light device that can irradiate the image taking range with light.

13. The game machine according to claim 1, further comprising:
a communication device that can conduct communication with a player terminal used by a player; and
a terminal output device that outputs the predetermined video picture to the player terminal through the communication device.

14. The game machine according to claim 1, wherein the physical drawing mechanism includes: a roulette wheel around which accommodation units in each of which the drawing medium can be accommodated are formed; and a guide path that can guides the drawing medium to each accommodation unit while restricting a movement range of the drawing medium, and
the physical drawing mechanism utilizes the accommodation units as the options, and performs as the drawing, a drawing using the accommodation unit, in which the drawing medium is accommodated, as the selected option.

15. The game machine according to claim 14, wherein the physical drawing mechanism further includes a driving mechanism that rotates the roulette wheel,
the roulette wheel is obliquely disposed such that a difference in height is formed in the accommodation units, and provided so as to be able to be rotated, and
range including the accommodation unit located in the lowest position of the accommodation units is set as the image taking range, and each accommodation unit is rotated in association with the rotation of the roulette wheel, whereby the image taking device takes the image of each of the accommodation units.

16. A control method of controlling a computer which is incorporated in a game machine, comprising the steps of:
utilizing a physical operation of a physical drawing mechanism, mounted within a frame of the gaming machine, to select at least one option from options by a drawing for a progression of a game;
taking images of the options in the progression of the game, using at least one image taking device;
displaying on a display device a video picture taken by the image taking device, the display device being mounted within the frame relative to the physical drawing mechanism;
detecting, using an option detection device, the option decided by the drawing of the physical drawing mechanism in the options;
a video picture specifying step that specifies a predetermined video picture range from the video picture taken by the image taking device, based on a detection result of the option detection device, so as to include the video picture of the selected option at a time when the selected option is selected; and
a video picture output step that displays a predetermined video picture on the display device based on the video picture in the predetermined video picture range specified by the video picture specifying step.

17. A non-transitory information recording medium storing a computer program for a game machine wherein the computer program is configured to make the game machine as:
a physical drawing mechanism, mounted within a frame of the game machine, that utilizes a physical operation of a drawing medium to select at least one option from options by a drawing for a progression of a game,
at least one image taking device that is placed to be able to take images of the options in the progression of the game;

a display device that can display a video picture taken by the image taking device, the display device being mounted within the frame relative to the physical drawing mechanism;

an option detection device that detects the option decided by the drawing of the physical drawing mechanism in the options;

a video picture specifying device that specifies a predetermined video picture range from the video picture taken by the image taking device, based on a detection result of the option detection device, so as to include the video picture of the selected option at a time when the selected option is selected; and a video picture output device that displays a predetermined video picture on the display device based on the video picture in the predetermined video picture range specified by the video picture specifying device.

* * * * *